(12) United States Patent
Krogmann

(10) Patent No.: US 6,629,085 B1
(45) Date of Patent: Sep. 30, 2003

(54) METHOD OF TRAINING A NEURAL NETWORK FOR THE GUIDANCE OF A MISSILE TO A TARGET

(75) Inventor: Uwe Krogmann, Überlingen (DE)

(73) Assignee: Bodenseewerk Geratetechnik GmbH, Uberlingen (DE)

( * ) Notice: Subject to any disclaimer, the term of this patent is extended or adjusted under 35 U.S.C. 154(b) by 0 days.

(21) Appl. No.: 09/353,163

(22) Filed: Jul. 14, 1999

(30) Foreign Application Priority Data

Jul. 21, 1998 (DE) .......................................... 198 32 612

(51) Int. Cl.$^7$ ............................................. G06F 15/18
(52) U.S. Cl. ......................................................... 706/2
(58) Field of Search .................. 706/2–4, 23

(56) References Cited

U.S. PATENT DOCUMENTS

| | | | | |
|---|---|---|---|---|
| 5,259,064 A | * | 11/1993 | Furuta et al. .................. | 706/23 |
| 5,751,915 A | * | 5/1998 | Werbos .......................... | 706/4 |
| 5,768,122 A | * | 6/1998 | Motoc .......................... | 700/50 |
| 5,924,085 A | * | 7/1999 | Werbos .......................... | 706/2 |
| 6,169,981 B1 | * | 1/2001 | Werbos ........................ | 706/23 |

OTHER PUBLICATIONS

Design of Advanced Guidance Law against High Speed Attacking Target, Chun–Liang Lin and Yung–Yue Chen, Proceeding National Science Council ROC(A), vol. 23, No. 1, (1999) pps. 60–74.*
Bayesian Belief Update in Antiair Defense, Sanguk Noh and Piotr J. Gmytrasiewicz; (1997) pps. 1–5.*
Optimal Controller Approximation Using Neural and Fuzzy–Neural Networks, Michael Niestroy; IEEE, (1996) pps. 486–491.*
THESIS; Physical Based Toolkit For Real–Time Distributed Virtual World, Henry Tong Ong, (Sep. 1995), Naval Postgraduate School, Monterey, California, pps. 1–54.*
Optimistic Real–Time Simulation; Kaushik Ghosh, Richard M. Fujimoto, and Karsten Schwan; (Jun. 28, 1995), pps. 1–17.*
Adaptive Traget State Estimation Using Neural Networks, P. K. Menon and V. Sharma; Optimal Synthesis, (1999), pps. 1–6.*
Computing, Research, and War: If Knowledge is Power, Where is responsibilty? Jack Beusmans and Karen Wieckert, Communications of trhe ACM, (Aug. 1989), vol. 32, No. 8, pps. 939–947.*

* cited by examiner

Primary Examiner—John Follansbee
Assistant Examiner—Michael B. Holmes
(74) Attorney, Agent, or Firm—Mallinckrodt & Mallinckrodt; Robert R. Mallinckrodt

(57) ABSTRACT

A method of training a neural network for the guidance of a missile to a target includes the steps of: computing a solution of the non-linear guidance problem in analytical form, generating numerical solutions for a number of flights of a virtual missile to a virtual target, determining a human pilot's behavior and of the missile by simulating a number of flights of the virtual missile to a virtual target, and "cloning" a neural or fuzzy-neural network with the knowledge about the guidance of the missile to the target as obtained by the preceding steps. For determining the behavior of the human pilot, a scenario of missile and target is represented. This scenario is transformed into slow-motion. The flight of the missile to the target is simulated in slow-motion, the human pilot guiding the missile to the target. The pilot's behavior and the behavior of the missile resulting therefrom is stored for a number of such simulated flights. The thus stored data are re-transformed into real time. A guidance unit having a neural or fuzzy-neural network is trained with the re-transformed behavior of pilot and missile.

5 Claims, 3 Drawing Sheets

METHOD OF TRAINING A NEURAL NETWORK FOR THE GUIDANCE OF A MISSILE TO A TARGET

BACKGROUND OF THE INVENTION

The invention relates to a method of training a neural network such that it will be able to guide a missile to a target.

Target tracking missiles have a seeker head which is able to detect, in an object scene, a target to be tracked. The seeker head and a signal processing unit, to which signals from the seeker head are applied, provide guidance signals. The guidance signals cause deflection of steering surfaces of the missile and, thereby, an angle of attack and a transverse acceleration such that the missile is guided on a collision course to the target. In prior art missiles, guidance of the missile is effected in accordance with the guidance law of "proportional navigation". With this mode of guidance, the angular rate of the line of sight to the missile in inertial space is determined. The transverse acceleration is made proportional to this angular rate.

If the target has high maneuvering capacity, is, for example, a highly maneuverable fighter aircraft, a "schematic" guidance in accordance with the guidance law of proportional navigation will not suffice. The required guidance laws become highly non-linear, when all occurring situations are to be taken into account.

SUMMARY OF THE INVENTION

It is an object of the invention to provide improved guidance of target tracking missiles.

To this end, a neural network is trained to guide a missile to a target. According to one aspect, the method of training the neural network comprises the steps of representing a scenario of missile and target, transforming this scenario into slow-motion, simulating the flight of the missile to the target, a human pilot guiding the missile to the target, storing the pilot's behavior and the reaction of the missile resulting therefrom for a number of such simulated flights, re-transforming the data thus stored into real time, and training a guidance unit provided with a neural or fuzzy-neural network with the behaviour of pilot and missile re-transformed into real time.

Thus the missile is equipped with a "virtual human pilot" in the form of a correspondingly trained neural network. The neural network reacts in the same way as a human pilot sitting in the missile would react. As the human pilot is not able to react as quickly as the events during tracking of the target by the missile take place, the target tracking is, at first, simulated in slow-motion. The behavior of pilot and missile is recorded, converted into digital data and stored. Then the data recorded in slow-motion are re-transformed into real time. Thereby, a set of simulation data and pilot's reactions for the various simulated situations is obtained. A neural or fuzzy-neural network is trained therewith. Thereby, the neural or fuzzy-neural network is "cloned" with the pilot's behavior and knowledges, and then behaves like a human pilot sitting in the missile.

According to another aspect of the invention, the solution of the non-linear guidance problem is computed in analytical form. Numerical solutions of a number of flights to a target are generated. The behavior of a pilot and of the missile is determined for a number of flights of the missile to a target by simulation. A neural or fuzzy-neural network is "cloned" with the knowledge about the guidance of the missile to the target, as obtained by the preceding steps.

Then, the neural or fuzzy-neural network, for the guidance of the missile, makes not only use of the human pilot's experience but, in addition, of analytically or numerically obtained knowledge about the behavior of the missile.

An embodiment of the invention is described in greater detail hereinbelow with reference to the accompanying drawings.

DESCRIPTION OF A PREFERRED EMBODIMENT OF THE INVENTION

Figure 1:
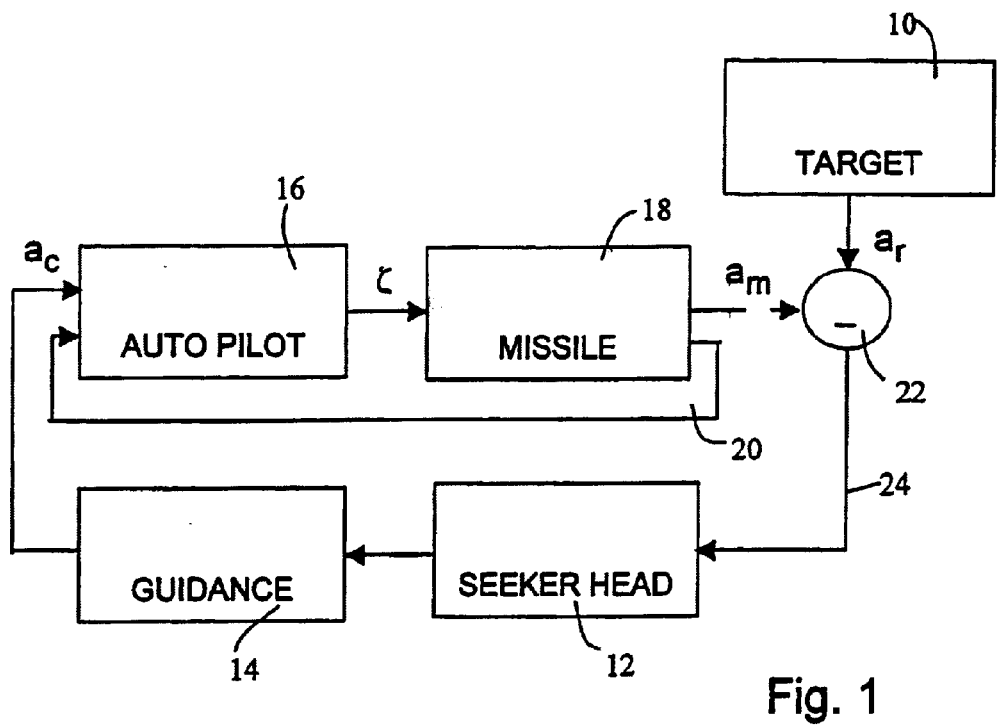
FIG. 1 is a block diagram and shows the guidance loop of a target tracking missile.

FIG. 1 shows the guidance control loop by means of which a missile is guided to a target. Numeral 10 designates a target such as a highly maneuverable enemy fighter aircraft. The target is detected by a seeker head 12 of the missile. The seeker head 12 provides signals which are applied as commanded transverse acceleration $a_c$ to an autopilot 16 in accordance with a guidance law which is represented as a block 14 in FIG. 1. The autopilot 16 commands a deflection $\zeta$ of a control surface. This results in a transverse acceleration $a_m$ in accordance with the missile dynamics which is represented by a block 18. Numeral 20 designates a feedback loop. Numeral $a_T$ designates the transverse acceleration of the target 10. A "summing junction" 22 forms the difference, which is detected by the seeker head 12. This is illustrated by arrow 24.

This is the conventional guidance loop of a target tracking missile.

Figure 2:
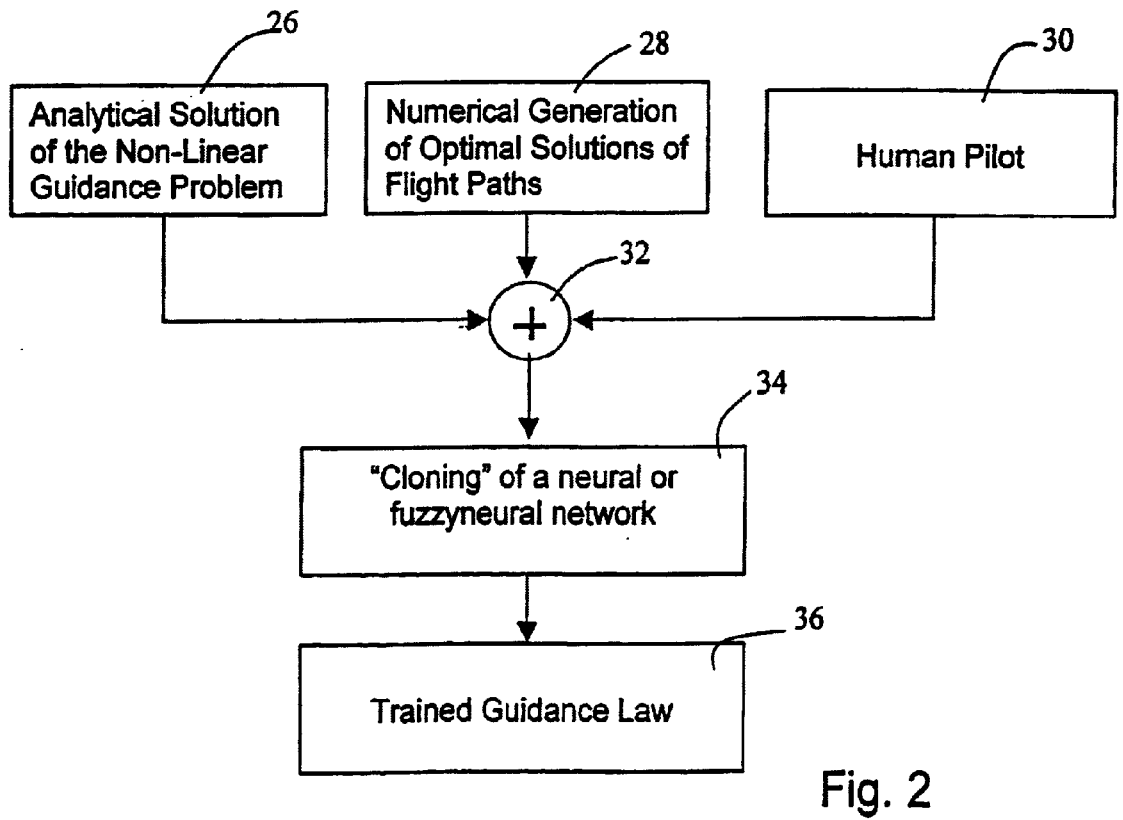
FIG. 2 is a block diagram and illustrates, how knowledge is acquired from different sources and how a neural or fuzzy-neural network is "cloned" correspondingly.

FIG. 2 illustrates the training of a neural or fuzzy-neural network on the basis of different sources of knowledge. Block 26 symbolizes the analytical solution of the non-linear guidance problem. Block 28 symbolizes the numerical generation of optimal solutions in open loop for a number of flights of the missile to the target. Block 30 symbolizes the guidance with a human pilot in the control loop ("pilot in the loop-guidance), as will be described hereinbelow. The knowledge thus acquired is combined, as illustrated by a "summing junction" 32 in FIG. 2.

A neural or fuzzy-neural network is trained on the basis of the guidance data obtained for different situations. This is illustrated by block 34. The neural or fuzzy-neural network is "cloned" on the basis of these data. This neural network replaces the blocks 14 "guidance law" and 16 "autopilot" of FIG.1.

Figure 3:
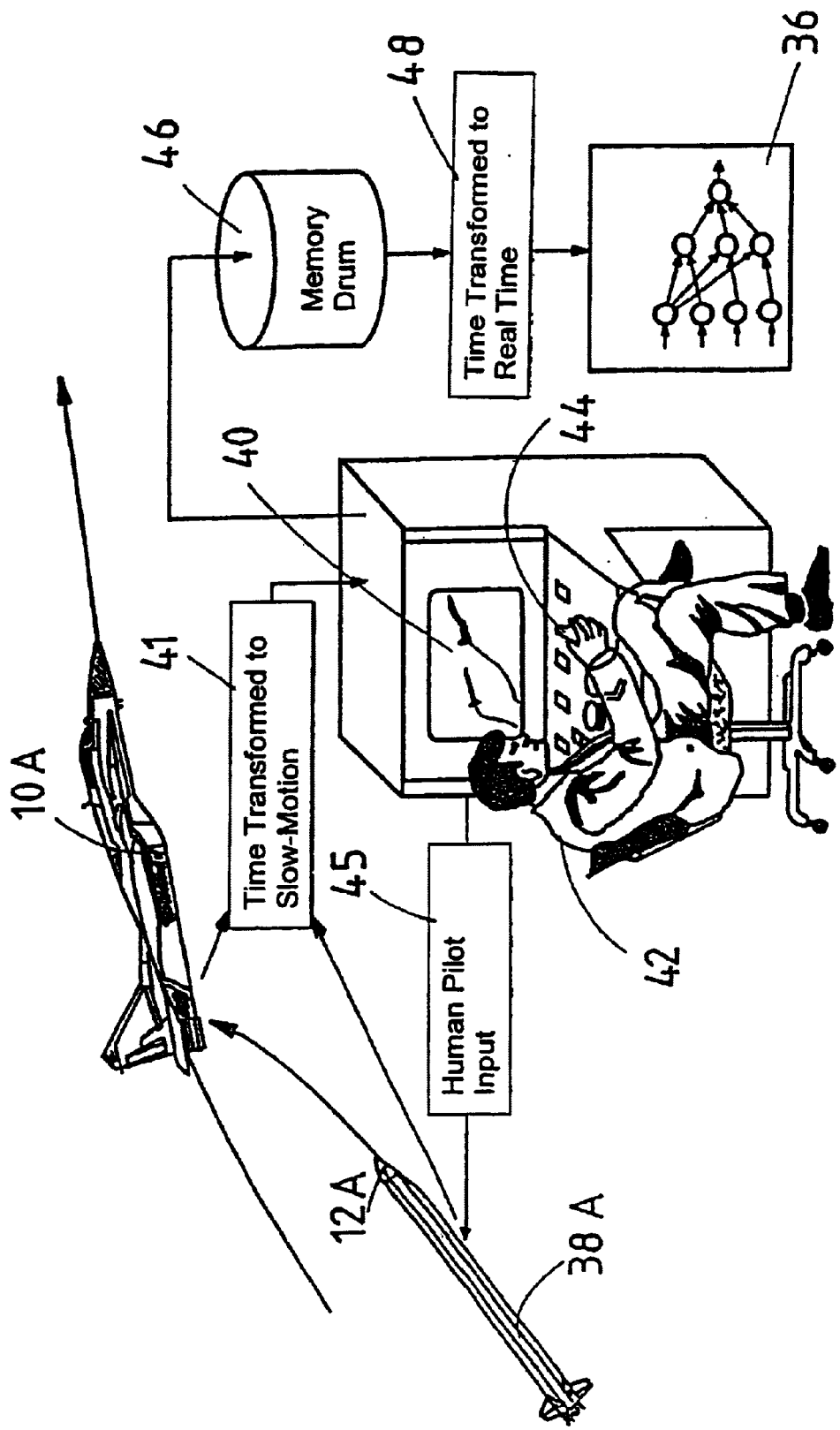
FIG. 3 is a schematic illustration and shows the "cloning" of a human pilot in the neural or fuzzy-neural network by connecting the human pilot into a control loop with virtual reality.

FIG. 3 is a schematic illustration and represents the simulated guidance with a human pilot in the control loop, and the training of the neural or fuzzy-neural network 36.

Referring to FIG. 3, numeral 10A designates a virtual target in the form of a highly maneuverable fighter aircraft, i.e. a target which exists only in the simulation. A similarly virtual missile 38A having a seeker head 12A is to be guided to the target 10A. This target tracking taking place in virtual reality is displayed on a monitor 40 in slow-motion with a time expansion by a factor λ. If it is the time scale of the virtual reality, and τ is the time scale of the slow-motion, then τ=λt. This transformation is illustrated by block 41. A human pilot 42 sees the target tracking in slow-motion on the monitor 40. Then he guides the virtual missile 38A to the target by means of a control stick 44. This is illustrated by block 45 in FIG. 3. With this guidance, experience and knowledge of the human pilot, for example about flight characteristics and flight behavior of a fighter aircraft in curves and evasive maneuvers, are also taken into account. As viewed by the pilot, the target tracking takes place in slow-motion. Thereby, the human pilot's limited capability of reacting is taken into account. The information and data obtained for different situations of target tracking are recorded as a function of the expanded time and are stored as digital data. This is symbolized by a memory drum 46. Now, the thus stored data are re-transformed or compressed in time into real time t in accordance with the relation $t=\lambda^{31}_1 \tau$. This is shown by block 48 in FIG. 3.

After the compression in time, the data of the human pilot's 42 actions are available for a number of target tracking situations. These data serve to train the neural or fuzzy-neural network 36. The pilot's 42 knowledge and experience are "cloned" in the neural network 36. Then this neural network 36 takes over the guidance of a real missile. In a particular target tracking situation, the neural network will guide the -real- missile 38 (FIG. 4) in the same way, in which this would be done by the human pilot, if he sat in the missile and wanted to guide it to the target.

Figure 4:
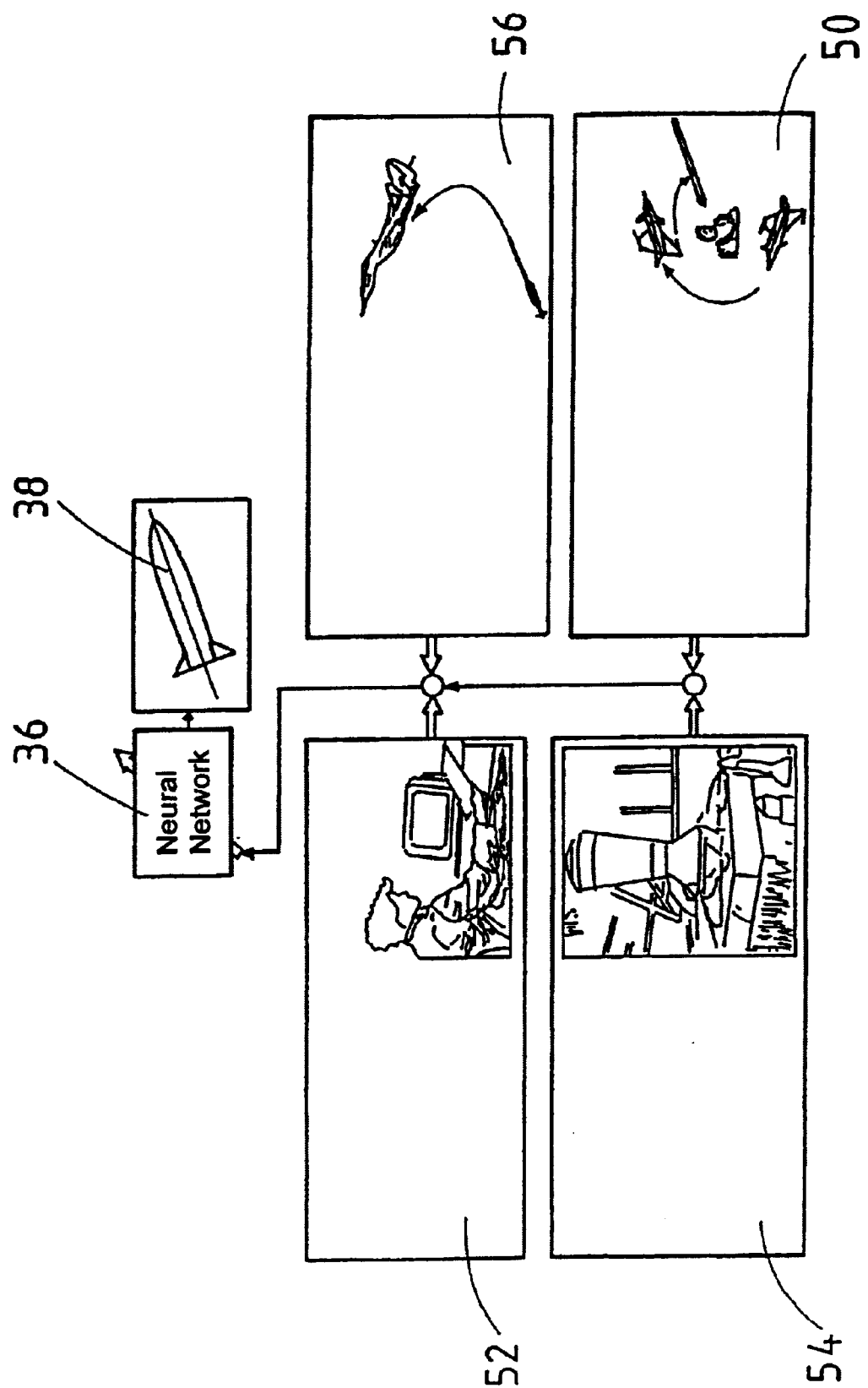
FIG. 4 schematilally illustrates, how knowledge for training the neural or fuzzy-neural network is acquired.

FIG. 4 illustrates the neural or fuzzy-neural network 36 and the real missile 38. The neural or fuzzy neural network 36 is trained by a human pilot in the loop as shown in FIG. 3. This is illustrated by block 50 in FIG. 4. Optionally, the neural or fuzzy-neural network can "learn" also from other sources. Block 52 symbolizes expert knowledge about the control behavior of the missile, something like the blocks 26 and 28 of FIG. 2. Block 56 symbolizes expert knowledge about the behavior of real sub-systems. Eventually, block 56 symbolizes the possibility of the neural or fuzzy neural network to acquire knowledge during the real mission. This may, for example, be the adapting of the guidance to the respective flight conditions and unpredictable disturbances and parameter changes. This knowledge to be acquired during the mission includes also the failure detection, failure identification and re-configuration of the sensors (FDIR).

All these sources for the learning process of the neural or fuzzy-neural network 36 are applied to the neural or fuzzy-neural network 36 as "learning signal", as schematically illustrated in FIG. 4.

I claim:

1. A method of training a neural or fuzzy-neural network such that it will be able to guide a missile to a target comprising the steps of:

representing a scenario of missile and target in virtual reality;

transforming said scenario into slow-motion;

simulating a flight of said missile to said target in said slow-motion, a human pilot guiding said virtual reality missile to said virtual reality target;

storing, for a number of such flights, slow-motion data representing the behavior of said human pilot and of the behavior of said virtual reality missile resulting therefrom;

re-transforming said stored slow-motion data into real time to provide real time data, and training said neural or fuzzy-neural network with said real time data representing the re-transformed behavior of said human pilot and missile.

2. A method of training a neural network such that it will be able to guide a missile to a target, such guidance presenting a mathematically non-linear guidance problem, comprising the steps of calculating a solution of said non-linear guidance problem in analytical form determining the behavior of a human pilot and of a virtual reality missile by simulating a number of flights of said virtual reality missile to a virtual reality target; and "cloning" a neural network or a fuzzy-neural network with the knowledge about the guidance of a missile to a target as obtained by the preceding steps.

3. A method of training a neural network such that it will be able to guide a missile to a target, such guidance presenting a mathematically non-linear guidance problem, comprising the steps of generating numerical solutions of said non-linear guidance problem for a number of flights of a virtual missile to a virtual target;

determining the behavior of a human pilot and of a virtual reality missile by simulating a number of flights of said virtual reality missile to a virtual reality target; and "cloning" a neural network or a fuzzy-neural network with the knowledge about the guidance of a missile to a target as obtained by the preceding steps.

4. A method of training a neural network such that it will be able to guide a missile to a target, such guidance presenting a mathematically non-linear guidance problem, comprising the steps of calculating a solution of said non-linear guidance problem in analytical form generating numerical solutions of said non-linear guidance problem for a number of flights of a virtual missile to a virtual target;

determining the behavior of a human pilot and of a virtual reality missile by simulating a number of flights of said virtual reality missile to a virtual reality target; and "cloning" a neural network or a fuzzy-neural network with the knowledge about the guidance of a missile to a target as obtained by the preceding steps.

5. A method as claimed in claim 4, wherein, for determining the behavior of a human pilot and of a virtual reality missile during flights of the missile to the target, the following steps are taken:

representing a scenario of missile and target in virtual reality;

transforming said scenario into slow-motion;

simulating a flight of said missile to said target in said slow-motion, a human pilot guiding said virtual reality missile to said virtual reality target;

storing, for a number of such flights, slow-motion data representing the behavior of said human pilot and of the behavior of said virtual reality missile resulting therefrom;

re-transformning said stored slow-motion data into real time to provide real time data, and using said re-transformed, real time data representing the re-transformed behavior of said human pilot and missile for said training of said neural or fuzzy-neural network.

* * * * *